United States Patent [19]
Jackson

[11] 3,770,559
[45] Nov. 6, 1973

[54] PRESSURE-SENSITIVE ADHESIVE LAMINATE
[75] Inventor: Barry Sidney Jackson, Stafford, England
[73] Assignee: Evode Limited, Stafford, England
[22] Filed: Jan. 11, 1971
[21] Appl. No.: 105,576

[52] U.S. Cl............... 161/89, 117/122, 161/95, 161/140, 161/151, 161/157, 161/167, 161/170, 161/236, 161/406
[51] Int. Cl........ B32b 5/16, B32b 7/06, C09i 7/02
[58] Field of Search............... 161/406, 167, 89, 161/94, 95, 96, 84, 85, 92, 82, 79, 57, 58, 88, 150, 170, 213, 224, 227, 236, 140, 151, 157; 117/68.5, 122 P, 122 PA

[56] References Cited
UNITED STATES PATENTS

| 2,358,761 | 9/1944 | Reed | 161/150 |
|---|---|---|---|
| 3,582,452 | 6/1971 | Britton | 161/167 |
| 2,828,798 | 4/1958 | Hopkins et al. | 161/406 |
| 2,359,250 | 9/1944 | Schmied | 161/224 |
| 3,260,661 | 7/1966 | Kemp et al. | 161/224 |
| 3,276,944 | 10/1966 | Levy | 161/150 |
| 3,542,634 | 11/1970 | Such et al. | 161/150 |

FOREIGN PATENTS OR APPLICATIONS

| 860,343 | 2/1961 | Great Britain | 117/68.5 |
|---|---|---|---|
| 974,310 | 11/1964 | Great Britain | 161/406 |
| 249,629 | 2/1964 | Australia | 161/236 |
| 1,135,042 | 11/1968 | Great Britain | 161/167 |

Primary Examiner—William A. Powell
Attorney—Linton & Linton

[57] ABSTRACT

A waterproof pressure sensitive adhesive laminate is provided in which a flexible plastics backing sheet is coated with a bituminous adhesive composition containing a minor proportion of rubber or thermoplastic polymer. The backing sheet is reinforced with a mesh or a woven or non-woven fabric which is embedded in the sheet and provides substantial resistance to stretching.

5 Claims, 2 Drawing Figures

FIG. 1.
FIG. 2.
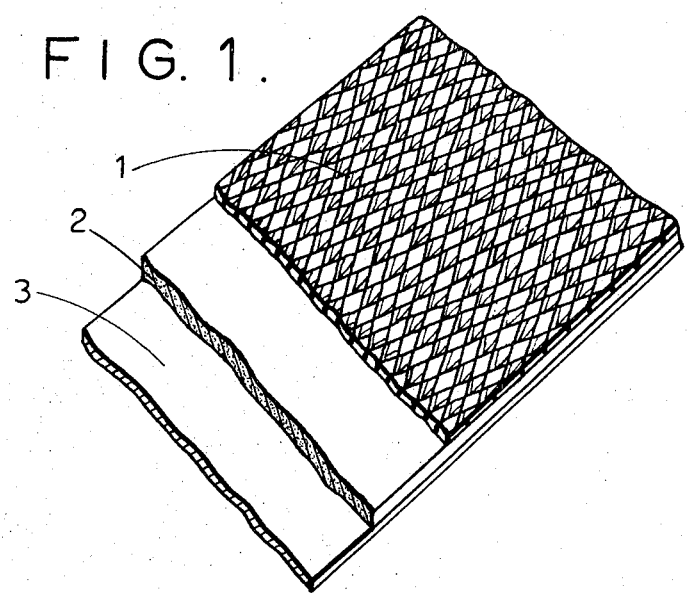
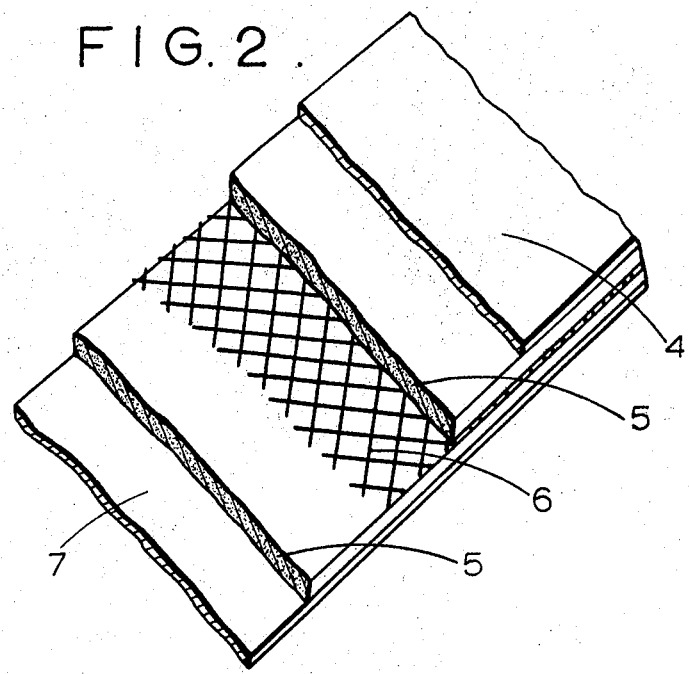
INVENTOR
BARRY SIDNEY JACKSON
BY
Linton and Linton
ATTORNEYS

PRESSURE-SENSITIVE ADHESIVE LAMINATE

BACKGROUND TO THE INVENTION

This invention relates to pressure-sensitive adhesive laminates, particularly when in the form of pressure-sensitive adhesive tapes.

Plastic tapes comprising a strip of a thermoplastic polymer having a coating of a pressure-sensitive adhesive are known and have been used for marking surfaces and sealing gaps. Their use has however been limited by their relatively low tensile strength and their tendency to become permanently stretched and distorted when subjected to quite small distorting loads. The short-comings of the prior art pressure-sensitive tapes are highlighted, for example, when one attempts to use them for marking roadways or floors which carry pedestrian or vehicular traffic. In such a case the passage of traffic quickly distorts the tape, with the result that the accuracy of the marking is quickly destroyed and the bond between the tape and surface breaks down in the area where the tape is distorted.

It is a principle object of the present invention to provide a pressure-sensitive adhesive laminate which does not suffer from the disadvantages referred to above.

SUMMARY OF THE INVENTION

According to one aspect of the present invention there is provided a pressure-sensitive adhesive laminate which comprises a layer of a pressure-sensitive adhesive composition coated onto a backing sheet of flexible plastics material which is inert to the adhesive composition and which is reinforced with a mesh or a woven or non-woven fabric which is bonded to said sheet or embedded therein and provides the sheet with substantial resistance to stretching, said laminate including a releasable protective layer of sheet material in contact with the exposed surface of the adhesive composition.

By virtue of the reinforcing mesh or fabric of the flexible plastics sheet, the laminate of the present invention can be used for example as a road marking device and would not distort when traffic passes over it.

The flexible plastics material preferred for use in the present invention is a polyvinyl chloride sheet reinforced with a polyester fibre fabric which is embedded in the film, for example by calendering. It will be appreciated, however, that other plastic sheet materials such a polyethylene or polypropylene can be employed and various reinforcing materials can be used including fabric or meshes formed from metal wires or plastics filaments. An example of a suitable flexible plastics material is that sold by Storey Brothers & Co. Ltd. of Lancaster, England under the trade mark "Plastolene."

According to another aspect of the present invention the backing sheet may comprise a self-bonded, non-woven polyamide fabric which is bonded to a layer of a pressure-sensitive adhesive composition. One example of a suitable polyamide fabric is the material sold under the trade mark "Cerex" by Monsanto Limited. This particular fabric is formed by heat fusion of a mat of nylon strands at their cross-over points so that the bonding between the polymer strands is permanent. This enables the production of a very light-weight fabric of exceptional strength. The preferred weight of fabric is between 0.5 and 3 oz. per sq. yd.

The adhesive composition employed in both aspects of the invention is preferably a mastic composition and its preferred thickness is between 0.005 inch and 0.1 inch. Generally the mastic layer should be thicker than the backing sheet.

We have found that mastic compositions based on bitumen give the best combination of adhesive and weather-proofing properties. Bituminous compositions which contain a thermoplastic polymer or a natural or synthetic rubber are preferred. The thermoplastic polymer or rubber fulfills the function of acting as a flexibiliser for the bitumen at low temperatures and also reduces the tendency of the bitumen to run or flow at high temperatures. The thermoplastic polymer or rubber is preferably present in an amount of up to 20 percent by weight of the bitumen. Examples of suitable thermoplastic polymers are polyethylene and polypropylene. The term "rubber" includes thermoplastic rubbers such as that sold under the trade mark "Cariflex" by Shell Chemical Company.

Ingredients which are compatible with bitumen and which serve to increase its tackiness, particularly at low temperatures, may be included in the composition. Examples of such materials are flux oil and petroleum resins. The remainder of the mastic composition may comprise fillers and extruders.

Typical formulations for suitable adhesive formulations are as follows (quantities are given as parts by weight in each case unless specifically stated to the contrary):

Formulation I
 Bitumen 190/210 pen. Value   611
 Polyethylene   68
 Flux oil T (Shell Chemical Co.)   68
 (Asbestos fibre   124
 Filler
 (Surface-treated carbonate   249

The adhesive is prepared by melting the bitumen and mixing the remaining ingredients into the molten bitumen. In the formulation, the proportion of flux oil may be varied so that it is present in an amount of from 8 to 15 percent by weight of the bitumen, and the proportion of polyethylene or other thermoplastic polymer varied so as to be present in an amount of from 5 to 18 percent by weight of the bitumen. The surface-treated carbonate is preferably present in an amount of from 15 to 30 percent by weight of the total adhesive composition and the fibrous filler is preferably present in an amount of from 0 to 20 percent by weight. Additional powdered filler may be present in an amount of up to 20 percent by weight of the total composition.

Formulation II
 Bitumen 190/210 pen. value   200
 60% Natural rubber latex (calculated as solids content)   4
 Acrawax C (a synthetic wax)   12
 Finely divided silica   10

In the formulation, the silica content may be varied to represent 5 to 15 parts per 200 parts of bitumen and the rubber latex (whether natural or synthetic) varied so as to represent 1 to 4 parts of rubber per 200 parts of bitumen. Preferably the wax is present in an amount of from 6 to 14 parts per 200 parts by weight of the bitumen.

Formulation III
 Bitumen 400/500 pen. value   105
 Cariflex TR1102   10
 Petroleum resin   30

"Cariflex" is a registered trade mark of Shell Chemical Company denoting a thermoplastic rubber. Fillers and extruders may be included in the composition.

Although, as stated above, bituminous adhesive compositions are preferred other waterproof, pressure-sensitive adhesive compositions may be employed, e.g., compositions based on chloroprene, butyl rubber or rosins.

In the case where the backing sheet is a self-bonded fabric, the adhesive may be simply bonded thereto so that there is little impregnation of the fabric. Alternatively the adhesive composition may partially or fully impregnate the fabric so that the composition "strikes through" on to the outer face.

The preferred method of applying the adhesive layer to the backing sheet is to deposit the adhesive mass (at a temperature at which it flows easily) from a hopper between a sheet of release paper and the backing sheet. A calender machine is stationed downstream of the hopper to spread the adhesive into a substantially uniform layer and to determine the extent of penetration of the mass into the backing sheet, if this is porous.

The outer face of the resulting laminate may be modified by application of a plastic or metallic foil and/or by a paint composition. In a preferred embodiment, the outer face is protected with an aluminium foil which may be coated on its outer surface with a vinyl lacquer. If desired the fabric may carry a layer of adhesive composition on each side although one layer is preferably substantially thicker than the other.

The product may be packaged in sheets or strips or other convenient form using an interleaving release material such as a silicone or wax treated paper. Stretchable crepe release papers are preferred.

The sealing materials of the present invention are useful as a general water-proofing, weather-proofing and general sealing material both in gasket form and for surface application.

It is found that the presence of the fabric reinforcement greatly improves the bursting and tear strength of sealing strips in accordance with this invention. Thus for example, a sealing strip in accordance with the invention and having an aluminium foil bonded to one face is an improvement on previous materials for flashing in roof work where the working surfaces are highly irregular. In contrast with sealing materials which do not possess a reinforcing fabric the present sealing strip can be forced into contact with an irregular surface without bursting and tearing so that the continuity of water-proofing is maintained. In addition, traditional materials for flashing work lie loosely on the surface to which they are shaped so that rain and snow may eventually find a way between the flashing and the underlying surface and enter the space which it is desired to protect. The present sealing strip provides a continuous self-adhesive surface, which means that when the strip is forced into intimate contact with the surface of the building a self-sealing action results, preventing ingress of water. Owing to the substantial thickness of the self-adhesive layer, minor surface irregularities are also sealed by slight spreading of the mass under the pressure of application.

It will be appreciated that instead of the polyamide fabric, other fabrics may be substituted provided that they exhibit similar characteristics of light-weight coupled with high strength and also are not adversely affected by the adhesive composition. Normally speaking such fabrics are non-woven fabrics produced from fibres which are capable of being fused intimately into one another at their cross-over points to form the necessary connection between the fibres. This results in a fabric whose strength approaches the theoretical value expected from knowledge of the strengths of the individual fibres. Alternatively, a similar result could be obtained by bonding the fibres together at their cross-over points using a separate bonding agent which is chemically similar to the fibres.

DESCRIPTION OF PREFERRED EMBODIMENTS

In the accompanying drawings FIG. 1 is a perspective view of one embodiment of a laminate in accordance with the invention partially broken away to show the construction; and FIG. 2 is a similar view of an alternative embodiment.

Referring to FIG. 1 of the drawings, a coloured polyvinyl chloride sheet 1 is reinforced with an open mesh polyester fibre fabric which is embedded in the polyvinyl chloride sheet. The sheet 1 is coated on one side with a relatively thick layer of a pressure-sensitive bituminous adhesive composition 2. A sheet of paper 3 having a coating of a release agent covers the exposed surface of the layer 2. In use the paper sheet 3 is stripped from the layer 2 and the exposed surface of the layer 2 is then applied to the roadway or floor to be marked. The laminate may be manufactured in strips of various widths which are coiled for easy transportation.

Referring to FIG. 2, an aluminium foil backing sheet 4 is bonded to a relatively thick layer of bituminous adhesive 5 which is reinforced internally with a self-bonded nylon fabric 6. A sheet of paper 7 having a coating of a release agent covers the exposed surface of the adhesive 5.

Useful sealing strips can also be produced in which the backing sheet is a metal or plastics foil and the foil is coated with an adhesive layer which is formulated as described. We have found that in the case of aluminium foil the thickness should be between 0.0005 inch and 0.005 inch, which in the case of copper, the foil should be not more than about 0.002 inch in thickness and of soft temper. Lead foil may also be used provided that it is between 6 and 12 ozs. weight per sq. foot, and all joints are double soldered. It is even possible to use stainless steel for the backing sheet provided the foil thickness is between 0.00025 inch and 0.00075 inch, preferably about 0.0005 inch in thickness.

What is claimed is:

1. A waterproof pressure sensitive adhesive laminate which comprises a layer of a pressure sensitive bituminous adhesive composition containing a minor proportion of a rubber or thermoplastic polymer coated onto a backing sheet of flexible plastics material which is inert to the adhesive composition and which is reinforced with a mesh or a woven or non-woven fabric which is completely embedded in said sheet and provides the sheet with substantial resistance to stretching, said adhesive layer being thicker than the backing sheet and said laminate including a releasable protective layer of sheet material in contact with the exposed surface of the adhesive composition.

2. A waterproof pressure sensitive adhesive laminate according to claim 1 wherein the adhesive comprises bitumen and polyethylene, the polyethylene being present in an amount of from 5 percent to 18 percent by weight of the bitumen.

3. A waterproof pressure-sensitive adhesive laminate which comprises a layer of a pressure sensitive bituminous adhesive composition containing a minor proportion of a rubber or thermoplastic polymer coated onto each surface of a reinforcement consisting essentially of a self-bonded, non-woven polyamide fabric having substantial resistance to stretching, one of the exposed surfaces of said adhesive composition being bonded to a thermoplastic or metal foil and the other being protected with a releasable protective layer of sheet material in contact with the exposed surface of the adhesive composition, the total thickness of the adhesive being greater than the thickness of the foil.

4. A waterproof pressure sensitive adhesive laminate according to claim 3 wherein the adhesive comprises bitumen and polyethylene, the polyethylene being present in an amount of from 5 percent to 18 percent by weight of the bitumen.

5. A pressure-sensitive adhesive laminate which comprises a backing sheet in the form of a metal foil selected from the group consisting of aluminium foil having a thickness of from 0.0005 inch to 0.005 inch, a soft temper coffer foil having a thickness of not more than about 0.002 inch, lead foil of 6 to 12 ozs. per sq. foot and stainless steel foil having a thickness of from 0.00025 inch to 0.00075 inch, a layer of a pressure-sensitive adhesive composition which is adhered to said foil and is thicker than said foil, a releasable protective layer of sheet material in contact with the exposed surface of the adhesive composition and said adhesive comprises bitumen and polyethylene, the polyethylene being present in an amount of from 5 percent to 18 percent by weight of the bitumen.

* * * * *